United States Patent [19]

Swars et al.

[11] Patent Number: 5,433,072
[45] Date of Patent: Jul. 18, 1995

[54] ASSEMBLY FOR REGULATING AND/OR MONITORING THE ELECTRIC HEATING OF A CATALYTIC CONVERTER SYSTEM

[75] Inventors: Helmut Swars, Bergisch Gladbach; Rolf Brück, Overath, both of Germany

[73] Assignee: Emitec Gesellschaft fuer Emissionstechnologie mbH, Lohmar, Germany

[21] Appl. No.: 270,384

[22] Filed: Jul. 5, 1994

Related Application Data

[63] Continuation of PCT/EP91/02433, Dec. 17, 1991, and PCT/EP92/00388, Feb. 24, 1992.

[30] Foreign Application Priority Data

Jan. 4, 1991 [DE] Germany ......................... 41 00 133.8

[51] Int. Cl.⁶ ................................................ F01N 3/28
[52] U.S. Cl. ......................................... 60/284; 60/300
[58] Field of Search ................................. 60/284, 300

[56] References Cited

U.S. PATENT DOCUMENTS

| | | |
|---|---|---|
| 4,372,261 | 2/1983 | Sarto . |
| 5,146,743 | 9/1992 | Maus ..................... 60/300 |
| 5,319,929 | 6/1994 | Cornelison ............. 60/300 |

FOREIGN PATENT DOCUMENTS

| | | |
|---|---|---|
| 2583001 | 12/1986 | France . |
| 2620670 | 3/1989 | France . |
| 2251631 | 5/1973 | Germany . |
| 2333092 | 1/1975 | Germany . |
| 2719252 | 8/1978 | Germany . |
| 2951316 | 7/1981 | Germany . |
| 3544205 | 6/1986 | Germany . |
| 3804915 | 9/1988 | Germany . |
| 3802159 | 8/1989 | Germany . |
| 4015558 | 11/1990 | Germany . |
| 1596717 | 8/1981 | United Kingdom . |
| 89/10470 | 11/1989 | WIPO . |

OTHER PUBLICATIONS

Japanese Patent Abstract No. 57105566 (Osamu), dated Jul. 1, 1982.
Japanese Patent Abstract No. 58035273 (Kiyoshi et al) dated Aug. 27, 1981.

*Primary Examiner*—Douglas Hart
*Attorney, Agent, or Firm*—Herbert L. Lerner; Laurence A. Greenberg

[57] ABSTRACT

A control assembly for monitoring and/or regulating the electric heating of a catalytic converter. The catalytic converter is connected in an exhaust gas system of an internal combustion engine for catalytically detoxifying the exhaust gas. The internal combustion engine is controlled by means of an engine control unit. An electronic component is provided which controls the electric heating of the catalytic converter. The electronic component is provided in addition to and separately from the engine control unit. Data signal lines allow the electronic component to communicate with the engine control unit.

14 Claims, 2 Drawing Sheets

ASSEMBLY FOR REGULATING AND/OR MONITORING THE ELECTRIC HEATING OF A CATALYTIC CONVERTER SYSTEM

CROSS-REFERENCE TO RELATED APPLICATIONS

This is a continuation of our international applications PCT/EP91/02433, filed Dec. 17, 1991, and PCT/EP92/00388, filed Feb. 24, 1992, both designating the United States.

BACKGROUND OF THE INVENTION

1. Field of the Invention

The invention relates to an assembly for regulating and/or monitoring the electric heating of a catalytic converter located downstream of an internal combustion engine as seen in an exhaust gas flow direction, for detoxifying the exhaust gas. The engine is provided with and controlled by an engine control system.

Electrically heatable catalytic converters are used in motor vehicles in order to meet especially stringent exhaust gas regulations. As a rule, they are disposed upstream of a main converter, as seen in the exhaust gas flow direction.

Excessive amounts of pollutants are produced in internal combustion engines particularly during the so-called cold starting phase, i.e. in the first few minutes of operation, before the engine reaches its final operating temperature. Precisely in this phase, the resultant pollutants cannot be well converted in catalytic converters, because these converters have not reached their operating temperature yet.

2. Description of the Related Art

To remedy this, WO 89/10470 and WO 89/10471 disclose electrically heated converters and methods for operating them. Such converters are heated with a relatively high current within a relatively short time to the temperature necessary for the proper catalytic reactions, so that a considerable portion of the pollutants produced in the cold starting phase can be converted. The heatable converters can be heated to their operating temperature either before the engine is started or immediately after it is started. It has also been known to combine these options. The high energy consumption of electrically heatable converters and the current intensities required for rapidly heating them make such a converter an atypical power consumer in a motor vehicle, which has to be electronically regulated and electrically switched using special means.

Two mutually contradictory interests must be taken into account. On the one hand, to meet exhaust gas regulations, it must be assured that the electrically heatable catalytic converter will reliably perform its task each time the engine is started. On the other hand, the availability of the motor vehicle should not be impaired by this component, as would be conceivable if there were malfunctions in the heatable converter unless additional precautions are taken. The fire safety of a motor vehicle must naturally also be assured, and damage to the exhaust cleaning system itself should be reliably avoided.

SUMMARY OF THE INVENTION

It is accordingly an object of the invention to provide an assembly for regulating and/or monitoring the electric heating of a catalytic converter, which overcomes the hereinafore-mentioned disadvantages of the heretofore-known devices of this general type in which maximum operating safety of the converter is achieved without impairing the availability of the motor vehicle.

With the foregoing and other objects in view there is provided, in accordance with the invention, an assembly for controlling the electrical heating of a catalytic converter connected in an exhaust gas system of an internal combustion engine for catalytically detoxifying the exhaust gas, wherein the internal combustion engine is controlled by means of an engine control unit. The assembly comprises an electronic component for controlling an electric heating of a catalytic converter, said electronic component being disposed separately from an engine control unit, and communication means connecting said electronic component with the engine control unit.

In accordance with an added feature of the invention, the electronic component includes a microprocessor, a data memory, and one or more control circuits which regulate the heating of the catalytic converter.

In accordance with an additional feature of the invention, the assembly includes power switch means connected to the electronic component for switching the electrical heating of the catalytic converter. A measuring line is provided between the electronic component and the power switch for enabling processing of a voltage drop across the power switch in the electronic component.

In accordance with a further feature of the invention, at least one sensor is provided which communicates with the electronic component. Preferably, the sensor is a temperature sensor in the catalytic converter.

In accordance with a number of further features of the invention, the at least one control circuit of the electronic component utilizes the catalytic converter as an associated controlled system, the power switch as an associated final control element, and the temperature in the catalytic converter as an associated control variable. As alternatives, the assembly is provided with a temperature sensor in the catalytic converter in the form of an actual-value transducer, means for calculating an actual temperature value by a heat balance calculation based on data received from the engine control unit, means for ascertaining an actual temperature value from measured values of temperature measurement transducers disposed outside the catalytic converter, and/or means for raising a temperature of the catalytic converter by specifying a heating time as a function of measured values. Also, the temperature of the catalytic converter may be raised by specifying a given fixed heating time.

In accordance with a concomitant feature of the invention, the electronic component includes means for processing logic signals and for deducing therefrom a likelihood of imminent initiation of operation of the motor vehicle, for instance in the form of a microprocessor receiving signals from a plurality of sensors and a data memory.

In other words, the electronic component which controls the heating of the catalytic converter is disposed separately from the engine control unit and it communicates with the engine control unit via data communication lines. The main advantage is found in a very much improved security against electromagnetically induced malfunctions.

We will in the following description freely interchange the terms "regulate", "monitor" and "control".

The latter is thereby intended to incorporate the first two terms.

The electronic component preferably includes one or more control circuits for regulating the heating of the catalytic converter. The electronic regulation preferably has the following characteristics:

a) the temperature of the converter is a controlled variable of at least two different control circuits;
b) in the normal state, the regulation is done by means of at least one preferred control circuit;
c) each control circuit in operation is automatically monitored in order to ascertain malfunctions;
d) if a malfunction is detected, then a switchover to a different control circuit is made automatically.

The active control of the converter temperature thereby does not solely depend on the function of a single control circuit. Instead, substitute control circuits are available, in the event that the preferred control circuit actually intended for the regulation is detected as being no longer functional. In particular, a failure of the electronic components, for instance the control circuits, does not impair the availability of the motor vehicle. For instance, if in the normal situation the regulation is done by a preferred control circuit whose actual-value transducer is a temperature sensor in the converter, then there is a risk that this temperature sensor may become defective. If additional precautions were not taken, then in that case the converter would either not be heated at all or it would be heated continually. Both of these scenarios are undesirable and the latter would even be dangerous. If a malfunction of the control circuit is ascertained, however, that circuit can be put out of operation and replaced by a different control circuit. The second control circuit can for example use a calculated temperature as the actual value, wherein that temperature is ascertained from data available from measuring sensors or from the engine control unit. In the simplest case, the regulation can be done by turning on the heating for a predeterminable time.

The required number of control circuits and which ones are furnished in an electronic component can depend on the applicable requirements for operational safety and availability of the electric heating of the catalytic converter. In order not to be dependent on a single control circuit, the electronic component may include at least two, for instance, of the following control circuits:

a) a control circuit with a temperature sensor in the catalytic converter as an actual-value transducer;
b) a control circuit in which the actual value is calculated by means of a heat balance calculation from data of the engine control unit;
c) a control circuit in which the actual value is ascertained from measured values from temperature measuring sensors outside the catalytic converter;
d) a control circuit that raises the temperature of the catalytic converter by specifying a heating time as a function of measured values, for instance from an ambient temperature sensor and/or an engine temperature sensor;
e) a control circuit that raises the temperature of the catalytic converter by specifying a fixed heating time.

All of these control circuits have the following elements in common: the catalytic converter as a controlled system, the power switch as a final control element, and the temperature in the catalytic converter as the controlled variable.

To carry out the regulation and to link the various sensor signals, the electronic component is provided with at least one microprocessor and a data memory.

If two or more control circuits are provided anyway, then it makes sense to put them into operation simultaneously, so as to enable mutual comparison and/or mutual monitoring with regard to malfunction. Then the control circuit having the simplest structure and hence the least likelihood of malfunction is assigned a securing function, in that it turns on the electric current if turn-on is not effected by other control circuits, and it turns off the current if a turnoff by the other control circuits in accordance with predetermined criteria does not occur. It makes sense to choose a pure timing control means as the simplest control circuit, which switches on the electric current for a predeterminable time interval and/or turns it off again after a predeterminable time interval. The time interval can also be made a function of certain values, such as the ambient temperature, engine temperature, or other criteria.

It is necessary, in order to assure that the motor vehicle is available, for all control circuits—and hence also the electric heating of the catalytic converter—to be put out of operation under certain preconditions. This is the case if certain predetermined conditions are met, such as the electrical voltage or available energy drops below a minimum that is required to start the engine, or if the voltage drop across the power switch is outside an allowable range. It is especially helpful to measure the voltage drop across the power switch. As long as the power switch is open, the full battery voltage is applied to it and can be checked. If the power switch is closed, then the voltage drop at this switch becomes very small as long as the system is functioning properly. If a larger voltage drop is present, then the catalytic converter is either short-circuited, or the power switch is defective and has an overly high resistance. Both these situations should cause shutoff of the heating system. When the power switch is closed, the voltage must decrease. If this is not the case, then the heating current circuit must have been interrupted. Measuring the voltage drop across the power switch is therefore a highly versatile way for monitoring the functional capability of the system.

Any malfunction in the heating system of the catalytic converter should be output as an error warning and/or it should be stored in memory. In many cases, the error source may be properly diagnosed therefrom or at least the number of possible error sources may be reduced. Depending on the code requirements in various countries, such an error warning may even entail limiting operation of the vehicle, so as to force the driver to seek out a repair facility.

A first control circuit preferably includes a temperature sensor in the catalytic converter as an actual-value transducer, which is connected to the electronic component. An actual-value transducer, which from data from the engine control unit and optionally by processing other measured values calculates an actual value for the temperature in the catalytic converter belongs to a second control circuit. Finally, a simple timing control means or a timing control means dependent on measured values is present as a further control circuit.

Referring now to the above-mentioned heat balance calculation, its importance comes into play when a temperature sensor is not present in the catalytic converter or when it is broken.

Principally, in an electronically controlled engine of the modern kind, a very large number of data are present in the engine control regarding the operational condition of the engine, so that it can be very exactly deduced therefrom how much fuel and how much air is reaching the engine at that moment, how much thereof is combusted, what the temperature is of the exhaust gas emanating at the exhaust manifold, and what residual energy content is still present in terms of yet convertible components in the exhaust gas.

The temperature may be very reliably determined from that information and the known heat capacity of the catalytic converter, as well as from its power drain during the electrical heating. The exhaust gas temperature Texh [°C.] can first be determined with an empirically determined approximation formula as follows:

$$Texh = m.A.(\log (t+2)^2)^B$$

where
- m = mass flow of gas [kg/s]
- A = system-defined constant, e.g. 300
- B = system-defined constant, e.g. 1.15
- t = time after engine start [s]

If the mass flow m of the gas is not available from the engine control, then it may be calculated as follows:

$$m = \frac{HV \cdot n \cdot \rho Gas \cdot Psuct}{2 \cdot Pamb}$$

where
- HV = engine stroke volume [m³]
- n = engine speed [1/s]
- ρGas = 1.2 [kg/m³]
- Psuct = suction pressure [bar]
- Pamb = ambient pressure [bar] = 1 [bar]

The required amount of energy QGas, for heating the exhaust gas to the operating temperature can be calculated recursively by iteration:

$$QGas_{(n)} = (Texh - Tstart).m.Cexh.QGas_{(n1)}$$

where
- n = index of calculation (e.g. second clock)
- Tstart = temperature at which the catalytic reaction in the converter starts [°C.]
- Cexh = heat capacity of exhaust gas = 1000 [J/kgK]

The amount of energy Qcat required for heating the catalytic converter to the temperature Tstart follows from:

$$Qcat = Qel.te - CHK. Tstart$$

where
- Qel = heating power supplied [W]
- te = time from beginning of heating
- CHK = heat capacity of catalytic converter [J/kgK]

The electrical heating power may be calculated recursively according to the following:

$$Qel_{(n)} = Qel_{(n-1)} + \frac{U^2}{RHK}$$

where
- U = battery voltage [V]
- RHK = electrical resistance of converter [Ω]

A sum total of the energy Qtot may be derived in the following heat balance calculation using the above calculated values:

$$Qtot_{(n)} = Qgas_{(n)} + Qcat + Qel_{(n)}$$

If $Qtot_{(n)}$ is negative, then the actual value of the temperature in the catalytic converter lies below Tstart, so that further heating is necessary. If $Qtot_{(n)}$ is positive, then the catalytic conversion begins, and heating may be stopped.

The setpoint value of the temperature in the catalytic converter and Tstart in the calculation may be time-dependently set higher with the age of the catalytic converter, so as to take into account a higher light-off temperature of the catalytic reaction due to the increased age of the catalyst. The constants A and B must be empirically adapted to vehicle-specific conditions, for instance to the distance of the catalytic converter from the engine and the layout of the exhaust gas system.

Other features which are considered as characteristic for the invention are set forth in the appended claims.

Although the invention is illustrated and described herein as embodied in an assembly for regulating and/or monitoring the electric heating of a catalytic converter, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
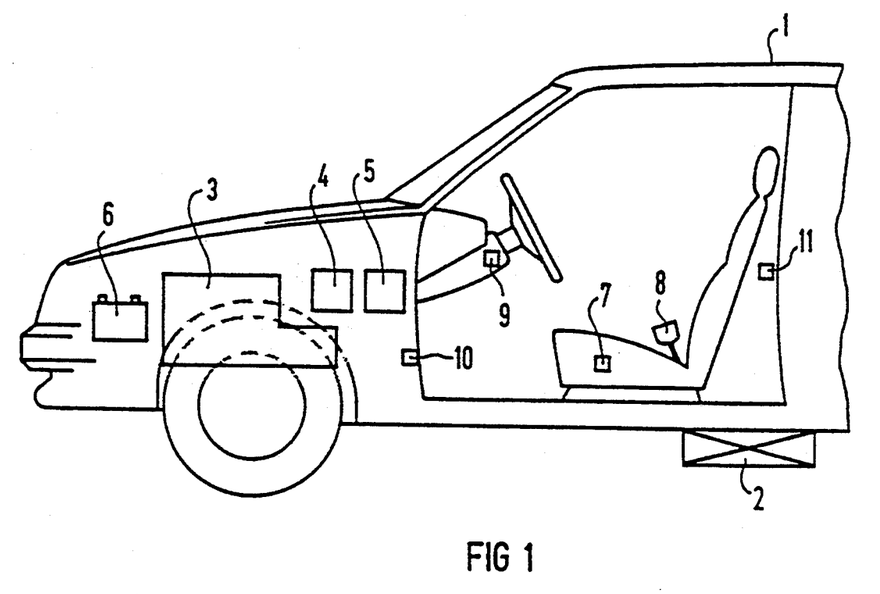
FIG. 1 is a schematic view of portion of a motor vehicle with an electrically heatable catalytic converter and other components.

Referring now to the figures of the drawing in detail and first, particularly, to FIG. 1 thereof, there is seen a forward portion of a motor vehicle 1 with an electrically heatable catalytic converter 2 disposed beneath the floorboard and downstream of an internal combustion engine 3, as seen in an exhaust gas flow direction. The engine 3 communicates with an engine control unit 4 via control and measurement lines 42. An electronic component 5 also communicates with the engine control unit via data communication lines 41. As schematically illustrated, the engine control unit 4 and the electronic component 5 can also be combined into one unit. The vehicle is equipped with a battery 6 and various sensors 7, 8, 9, 10 and 11 disposed at the driver's seat, the safety belt lock, the ignition lock, the door and/or the door handle, respectively. A temperature sensor 12 for measuring the outside temperature or the engine temperature can also be present. A heavy duty switch or power switch 20, which is suitable for switching high currents, it disposed generally near the battery.

Figure 2:
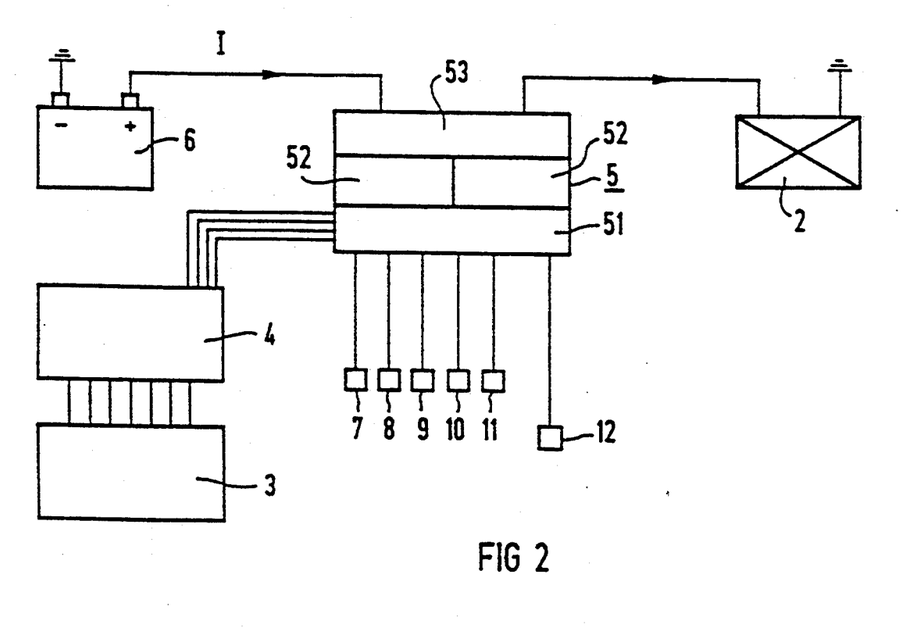
FIG. 2 is a diagrammatic view of an electrical and electronic system forming part of the electrically heatable catalytic converter.

Referring now specifically to FIG. 2, the actual heating current circuit comprises the battery 6, the heating current line 61, the power switch 20, the heating current line 21, the catalytic converter 2, the ground 22, and the ground 62. In principle, a generator could be used as an energy source instead of the battery 6, if the heating of the catalytic converter is to be done only after the engine 3 is started.

The power switch 20 is triggered as needed by the electronic component 5 via a control line 27. The voltage drop across the power switch 20 can be measured with a voltmeter 25, and a signal representative of the measurement outcome can be communicated to the electronic component 5 via a measuring line 26. The electronic component 5 communicates with the engine control unit 4 via the lines 41, so that data can be transmitted both from the engine control unit 4 to the electronic component 5 and vice versa.

The electronic component 5 also communicates via a measuring line 24 with a temperature sensor 23 in the catalytic converter 2. The signals from of the optional sensors 7, 8, 9, 10, 11, and an optional temperature probe 12 can also lead to the electronic component 5.

Figure 3:
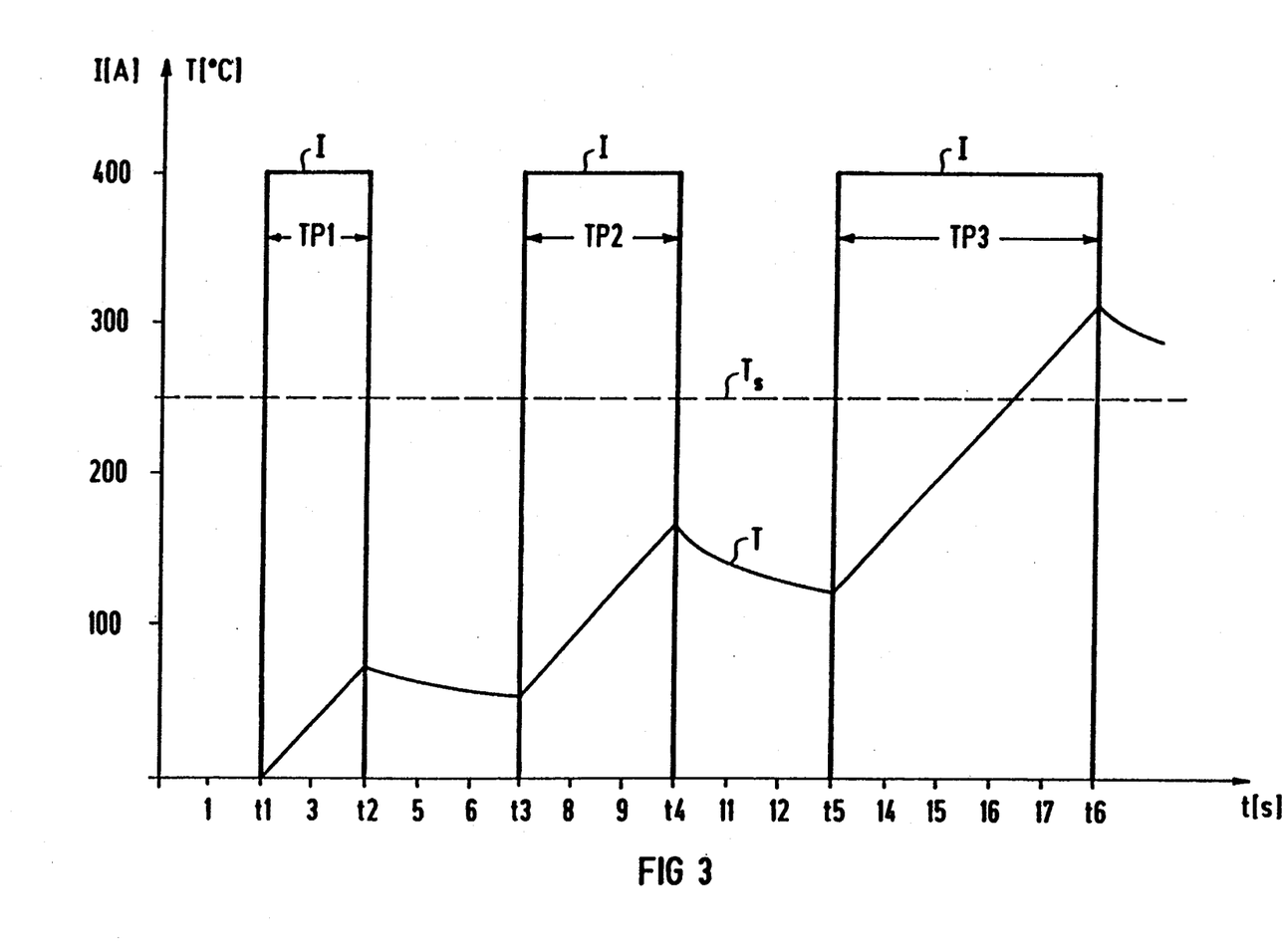
FIG. 3 is a schematic view of an electronic component with a plurality of control circuits.

FIG. 3, quite schematically, shows an exemplary embodiment for the basic layout of the electronic component 5. The component includes three or more sets of control circuit electronics 52, 53, 54. The control circuit electronics 52 serve to regulate the temperature in the catalytic converter 2, using the temperature measurement value of the temperature sensor 23 as an actual or real time value. The control circuit electronics 54 use an actual or real time value that is ascertained from a heat balance calculation. This calculation is done with data from the engine control unit communicated through the lines 41. The control circuit electronics 53 include a timing control means for heating the catalytic converter, optionally taking external measured values into account in calculating the heating interval. For instance, if a signal is received from the sensor 11, indicating that the car door is being opened, a relatively short heating interval is initiated. If a signal is received from the sensor 8, indicating that a start of the engine is highly imminent, a longer heating interval is initiated. The module 53 may naturally take additional information into account, such as, for instance, the outside temperature, engine temperature, catalytic converter temperature, etc.

Monitoring electronics 51 monitor the control circuits for their functional capability and effect a switchover from a nonfunctional control circuit to a functional one if a defect in the control circuit that is in operation is ascertained. The monitoring electronics 51 can also take other information into account, for instance information on the voltage drop at the power switch 20, and if abnormal situations arise can interrupt the heating or not initiate the heating in the first place.

We claim:

1. An assembly for controlling the electrical heating of a catalytic converter connected in an exhaust gas system of an internal combustion engine for catalytically detoxifying the exhaust gas, wherein the internal combustion engine is controlled by means of an engine control unit, the assembly comprising:

an electronic component for controlling an electric heating of a catalytic converter, said electronic component being disposed separately from an engine control unit, and data communication lines connecting said electronic component with the engine control unit for allowing said electronic component to communicate with the engine control unit.

2. The assembly according to claim 1, wherein said electronic component includes a microprocessor, a data memory, and a control circuit for regulating the heating of the catalytic converter.

3. The assembly according to claim 1, wherein said electronic component includes a microprocessor, a data memory, and a plurality of control circuits for regulating the heating of the catalytic converter.

4. The assembly according to claim 1, which further comprises power switch means connected to said electronic component for switching the electrical heating of the catalytic converter.

5. The assembly according to claim 4, which further comprises a measuring line connected between said electronic component and said power switch for enabling processing of a voltage drop across said power switch in said electronic component.

6. The assembly according to claim 1, which further comprises at least one sensor communicating with said electronic component.

7. The assembly according to claim 6, wherein said at least one sensor is a temperature sensor in the catalytic converter.

8. The assembly according to claim 1, wherein said electronic component includes at least one control circuit, said at least one control circuit having the catalytic converter as an associated controlled system, said power switch as an associated final control element, and the temperature in the catalytic converter as an associated control variable, and wherein the assembly further comprises a temperature sensor in the catalytic converter in the form of an actual-value transducer.

9. The assembly according to claim 1, wherein said electronic component includes at least one control circuit, said at least one control circuit having the catalytic converter as an associated controlled system, said power switch as an associated final control element, and the temperature in the catalytic converter as an associated control variable, and wherein said electronic component further includes means for calculating an actual temperature value by a heat balance calculation based on data received from the engine control unit.

10. The assembly according to claim 1, wherein said electronic component includes at least one control circuit, said at least one control circuit having the catalytic converter as an associated controlled system, said power switch as an associated final control element, and the temperature in the catalytic converter as an associated control variable, and wherein an actual temperature value is ascertained from measured values of temperature measurement transducers disposed outside the catalytic converter.

11. The assembly according to claim 1, wherein said electronic component includes at least one control circuit, said at least one control circuit having the catalytic converter as an associated controlled system, said power switch as an associated final control element, and the temperature in the catalytic converter as an associated control variable, and wherein a temperature of the catalytic converter is raised by specifying a heating time as a function of measured values.

12. The assembly according to claim 1, wherein said electronic component includes at least one control circuit, said at least one control circuit having the catalytic converter as an associated controlled system, said power switch as an associated final control element, and the temperature in the catalytic converter as an associated control variable, and wherein a temperature of the catalytic converter is raised by specifying a given fixed heating time.

13. An assembly for controlling the electrical heating of a catalytic converter connected in an exhaust gas system of an internal combustion engine for catalytically detoxifying the exhaust gas, wherein the internal combustion engine is controlled by means of an engine control unit, the assembly comprising;

an electronic component for controlling an electric heating of a catalytic converter, said electronic component being disposed separately from an engine control unit, and communication means connecting said electronic component with the engine control unit, wherein said electronic component includes means for processing logic signals and for deducing therefrom a likelihood of imminent startup of the internal combustion engine.

14. The assembly according to claim 13, wherein said processing means are a microprocessor receiving signals from a plurality of sensors and a data memory.

* * * * *

UNITED STATES PATENT AND TRADEMARK OFFICE
CERTIFICATE OF CORRECTION

PATENT NO. : 5,433,072

Page 1 of 3

DATED : July 18, 1995

INVENTOR(S) : Helmut Swars

It is certified that error appears in the above-identified patent and that said Letters Patent is hereby corrected as shown below:

The title page, showing the illustrative figure, should be deleted and substitute therefor the attached title page.

The drawing sheet, consisting of Fig 2, should be deleted to be replaced with Fig. 2, as shown on the attached page.

Signed and Sealed this

Fifteenth Day of April, 1997

*Attest:*

BRUCE LEHMAN

*Attesting Officer*      Commissioner of Patents and Trademarks

United States Patent [19]
Swars et al.

[11] Patent Number: 5,433,072
[45] Date of Patent: Jul. 18, 1995

[54] ASSEMBLY FOR REGULATING AND/OR MONITORING THE ELECTRIC HEATING OF A CATALYTIC CONVERTER SYSTEM

[75] Inventors: Helmut Swars, Bergisch Gladbach; Rolf Brück, Overath, both of Germany

[73] Assignee: Emitec Gesellschaft fuer Emissionstechnologie mbH, Lohmar, Germany

[21] Appl. No.: 270,384

[22] Filed: Jul. 5, 1994

Related Application Data

[63] Continuation of PCT/EP91/02433, Dec. 17, 1991, and PCT/EP92/00388, Feb. 24, 1992.

[30] Foreign Application Priority Data

Jan. 4, 1991 [DE] Germany .......... 41 00 133.8

[51] Int. Cl.⁶ .......... F01N 3/28
[52] U.S. Cl. .......... 60/284; 60/300
[58] Field of Search .......... 60/284, 300

[56] References Cited

U.S. PATENT DOCUMENTS

| | | | |
|---|---|---|---|
| 4,372,261 | 2/1983 | Sarto . | |
| 5,146,743 | 9/1992 | Maus | 60/300 |
| 5,319,929 | 6/1994 | Cornelison | 60/300 |

FOREIGN PATENT DOCUMENTS

| | | |
|---|---|---|
| 2583001 | 12/1986 | France . |
| 2620670 | 3/1989 | France . |
| 2251631 | 5/1973 | Germany . |
| 2333092 | 1/1975 | Germany . |
| 2719252 | 8/1978 | Germany . |
| 2951316 | 7/1981 | Germany . |
| 3544205 | 6/1986 | Germany . |
| 3804915 | 9/1988 | Germany . |
| 3802159 | 8/1989 | Germany . |
| 4015558 | 11/1990 | Germany . |
| 1596717 | 8/1981 | United Kingdom . |
| 89/10470 | 11/1989 | WIPO . |

OTHER PUBLICATIONS

Japanese Patent Abstract No. 57105566 (Osamu), dated Jul. 1, 1982.
Japanese Patent Abstract No. 58035273 (Kiyoshi et al) dated Aug. 27, 1981.

Primary Examiner—Douglas Hart
Attorney, Agent, or Firm—Herbert L. Lerner; Laurence A. Greenberg

[57] ABSTRACT

A control assembly for monitoring and/or regulating the electric heating of a catalytic converter. The catalytic converter is connected in an exhaust gas system of an internal combustion engine for catalytically detoxifying the exhaust gas. The internal combustion engine is controlled by means of an engine control unit. An electronic component is provided which controls the electric heating of the catalytic converter. The electronic component is provided in addition to and separately from the engine control unit. Data signal lines allow the electronic component to communicate with the engine control unit.

14 Claims, 2 Drawing Sheets

UNITED STATES PATENT AND TRADEMARK OFFICE
CERTIFICATE OF CORRECTION

PATENT NO. : 5,433,072
DATED : July 18, 1995
INVENTOR(S) : Helmut Swars et al.

It is certified that error appears in the above—identified patent and that said Letters Patent is hereby corrected as shown below:

Correct Fig. 2 as follows:

FIG 2